United States Patent

[11] 3,565,403

| [72] | Inventor | James T. Matsuoka |
| | | Brecksville, Ohio |
| [21] | Appl. No. | 758,195 |
| [22] | Filed | Sept. 5, 1968 |
| [45] | Patented | Feb. 23, 1971 |
| [73] | Assignee | Intercole Automation, Inc. |
| | | Cleveland, Ohio |

[54] CONTINUOUS MIXER
10 Claims, 5 Drawing Figs.

[52] U.S. Cl. ........................................... 259/6; 18/2; 259/104
[51] Int. Cl. ........................................... B01f 7/08, B29b 1/10
[50] Field of Search ........................................... 259/6, 21, 41, 104, 109, 110; 18/2 (EP)

[56] References Cited
UNITED STATES PATENTS

| 3,154,808 | 11/1964 | Ahlefeld, Jr. et al. | 18/2(EP) |
| 3,230,581 | 1/1966 | Tyson et al. | 18/2(EP) |
| 3,305,894 | 2/1967 | Boden et al. | 18/12(SP) |
| 3,423,074 | 1/1969 | Loomans | 259/6 |

*Primary Examiner*—Edward L. Roberts
*Attorney*—Watts, Hoffman, Fisher & Heinke

ABSTRACT: A continuous mixer of the type used to mix rubber, plastic and the like, having two rotors each with a mixing portion and an adjacent screw-type feeding portion, the mixing portion of one of the rotors having two blades each with blade portions that twist in opposite directions and the other rotor having four blades arranged in pairs, one pair adjacent each opposite end of the mixing portion, the blades of each pair twisting in opposite directions from those of the other and terminating centrally of the mixing portion.

PATENTED FEB 23 1971

INVENTOR.
JAMES T. MATSUOKA
BY
Watts, Hoffmann, Fisher & Heinke
ATTORNEYS.

PATENTED FEB 23 1971 3,565,403

INVENTOR.
JAMES T. MATSUOKA
BY
Watts, Hoffmann, Fisher & Heinke
ATTORNEYS.

CONTINUOUS MIXER

This invention relates to a continuous mixer and rotors therefor of the type used to mix rubber, plastic and the like.

Continuous mixers suitable for mixing rubber, plastic or other similar materials are typically provided with two mixing rotors driven in counter rotation within a mixing chamber. The rotors have a mixing portion for thoroughly mixing materials and a feeding portion for advancing the materials from a hopper to the mixing portion of the blade. The mixing portions of the rotors typically have plural blades or wings that extend outward from a central rotor body and work the material within the chamber when the rotors are driven.

It is an object of the present invention to provide a new and improved rotor, and more particularly a four bladed rotor, having a material feeding portion and a mixing portion for use in continuous mixers of the type described above, that will efficiently feed and mix material rapidly and effectively.

It is another object of this invention to provide a new and improved four-bladed rotor with blades arranged in two pairs extending inward from opposite ends of a mixing portion of the rotor in opposite helical paths with the blades of each pair displaced one from the other 180 angular degrees circumferentially about the rotor and being displaced peripherally from an adjacent blade of the other pair to provide a gap therebetween.

It is another object of this invention to provide a new and improved continuous mixer of the type referred to above having two adjacent rotors with bladed mixing portions each having a different arrangement of blades.

It is another object of this invention to provide a new and improved continuous mixer of the type referred to above that utilizes two side-by-side rotors of different construction, each with a feeding and mixing section, one of said rotors having two blades and the other having four blades, the two blades of the one rotor each having blade portions twisting in opposite directions and the four blades of the second rotor arranged in pairs, one pair adjacent each opposite end of the mixing portion of the rotor, the blades of each pair twisting in opposite directions from those of the other and terminating centrally of the mixing portion in peripherally spaced and axially overlapped relationship.

It is another object of this invention to provide a new and improved continuous mixer of the type referred to above that has a chamber with an inlet adjacent one end and an outlet adjacent an opposite end for the continuous flow of material, first and second substantially parallel rotors in the chamber, each with a feed screw adjacent the inlet end of the chamber and a mixing portion adjacent the outlet end of the chamber, the mixing portion of one rotor having two oppositely projecting blades each with portions that curve or twist in opposite directions along the axial extent of the mixing portion, and the mixing portion of the other rotor having two pairs of blades projecting in opposite directions from a generally cylindrical body portion of the rotor, one pair extending from each end of the mixing portion axially toward the center in curved, preferably helical, paths and terminating in axially overlapped and peripherally spaced relationship, the blades of one pair curving or twisting in an opposite direction from the blades of the other pair, with corresponding blade portions considered in an axially outward direction from the respective adjacent inner ends thereof being displaced angularly, i.e., peripherally one from the other about the rotor and with gaps separating inner end portions of adjacent blades of opposite pairs and extending radially inward to a depth approaching the cylindrical body portions of the rotor.

It is another object of this invention to provide a new and improved continuous mixer rotor having helical blades of uniform pitch forming a double screw thread feeding portion and having an adjacent mixing portion with a pair of blades with ends joining the helical blades of the feeding portion so that material fed by the helical blades of the feeding portion can flow from the feeding portion to the mixing portion of the rotor without hindrance from ends of the mixing blades and with the flow of material already divided for introduction to the two mixing zones on opposite sides of the blades.

The invention resides in certain constructions and combinations and arrangements of parts, and further objects and advantages of the invention will be apparent to those skilled in the art to which it relates from the following description of the preferred embodiment, described with reference to the accompanying drawings forming a part of this specification, in which similar reference characters designate corresponding parts and in which.

Figure 1:
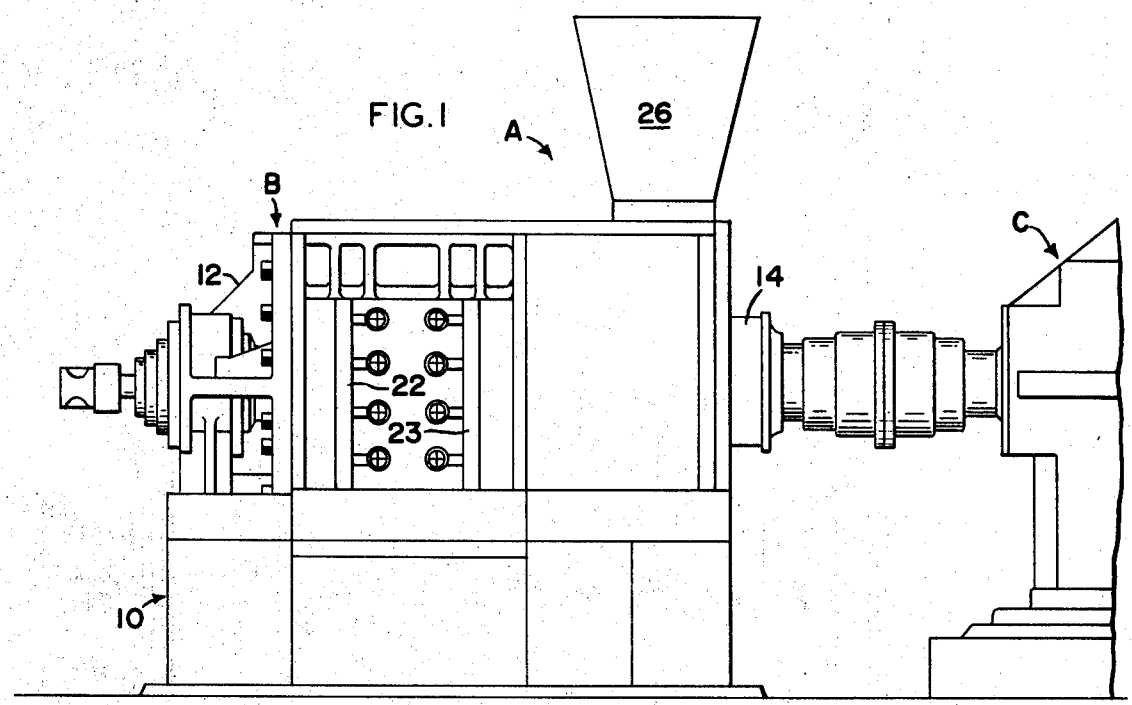
FIG. 1 is a side elevational view of a continuous mixer embodying the present invention.

With reference to the drawings, a continuous mixing machine embodying the present invention is indicated generally at A and includes a mixer B in which material such as rubber, plastic or the like is mixed by rotors, and a drive unit C in the form of a motor driven gear reducer that drives the rotors of the mixer B.

The mixer B includes a heavy, fabricated, base structure 10 that supports two opposite a end frames 12, 14, intermediate side members 16, 18 which are generally curved and joined at the top and bottom to define a chamber 20 having a feeding section 20a and a mixing section 20b, and two side-by-side horizontal mixing rotors 30, 32. The interior of the chamber 20 is contoured to form two horizontally extending side-by-side chamber portions that are generally cylindrical and separate in the feeding section and that are partially cylindrical and communicate longitudinally in the mixing section. This provides an inner surface 21 that closely surrounds the two side-by-side rotors 30, 32. The temperature of the side members 16, 18 can be controlled along the mixing section 20b by fluid introduced through headers 22, 23 which communicate with conduits within the side members. The chamber 20 has a top opening directly beneath a feed hopper 26 above the feeding section 20a, and a bottom discharge opening 28 at the end of the mixing section 20b farthest from the feeding section. The discharge opening 28 includes a door (not shown) or other means adjustable to vary the rate of product discharge and hence the working temperature and pressure within the chamber.

The two horizontal side-by-side rotors 30, 32 are journaled at opposite ends of the chamber 20 in the end frames 12, 14 and extend from the end frame 14, where they are connected by couplings 34, 35 to two side-by-side counter rotating output shafts 36, 37 of the drive unit C. The drive unit C is a compound drive reducer driven by an electric motor (not shown). Alternatively, a single shaft from a drive unit can be coupled to one rotor and the rotors interconnected for counter rotation by gearing.

Each rotor 30, 32 may be considered as having a central cylindrical body portion 40, 42 with a feeding portion F and a mixing portion M within the chamber 20. A double screw 44, 46 of uniform lead angle and thread depth is formed on each rotor 30, 31, respectively, by helical blades 44a, 44b and 46a, 46b, which extend from the body portions. Because the rotors 30, 32 are driven in counter rotation by the drive unit C, the feed screws 44, 46 twist in opposite directions about the body portions so that both feed work product introduced to the chamber 20 from the hopper 26 in a direction toward the mixing portions M of the blades.

The mixing portions M of the two rotors 30, 32 include blades that extend from the basic cylindrical body portions 40, 42 and which provide a continuous rotor surface along the mixing portions. Each rotor is differently constructed in the preferred embodiment shown to impart a different mixing action to material within the chamber 20.

Figure 2:
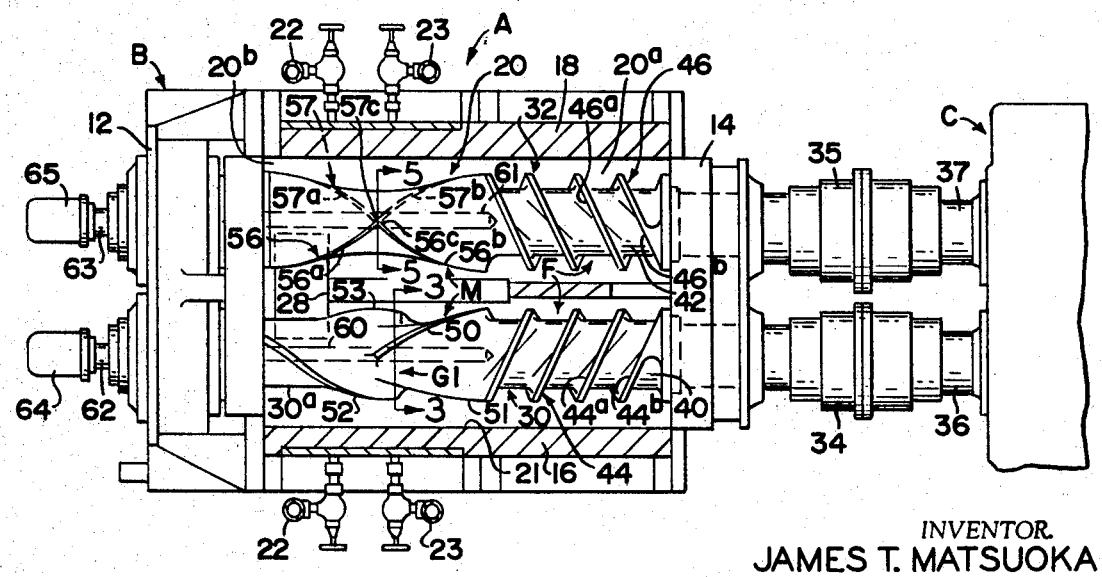
FIG. 2 is a plan view, with parts in section and parts removed, of the mixer of FIG. 1, showing the construction and arrangement of the rotor blades of the mixer.
Figure 3:
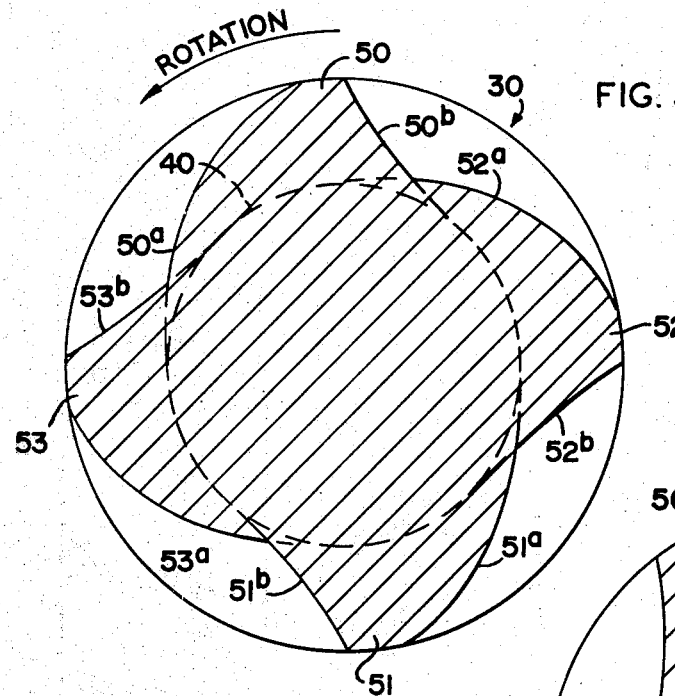
FIG. 3 is a sectional view of the four-bladed rotor of FIG. 2, taken along the line 3—3; 3-3.

The rotor 30 has four blades 50, 51, 52, 53 arranged in pairs 50, 51 and 52, 53. The blades of each pair project in opposite directions from the central rotor body portion 40 (i.e., are 180° apart in a transverse plane, as shown in FIG. 3). The pair of blades 50, 51 is located at the feed end of the mixing portion M of the rotor and the pair of blades 52, 53 is at the discharge end. Each blade of a pair curves or twists about the rotor body, preferably helically, from an end of the mixing portion toward the center, in the same direction as the other blade of the pair, while the blades of the two pairs twist or curve in opposite directions about the rotor away from the direction of rotor rotation as they progress toward the center of the mixing portion. One pair of blades is displaced angularly from the other so that inner ends are peripherally spaced. Preferably the length of the blades is such that the inner ends overlap axially of the rotor. The blades 52, 53 are preferably longer than the blades 50, 51 with the inner ends located beyond the center of the mixing portion M, toward the feed portion F. Preferably the inner ends of the blades 50, 51 are also located to the same side of the center of the mixing portion as the inner ends of blades 52, 53. The angular displacement between the inner ends of adjacent blades provides gaps G1, G2 (see FIGS. 2 and 4) through which material being mixed can back-flow for remising. The gaps extend radially inward to a depth that approximately corresponds to the peripheral extent of the basic cylindrical rotor body portion 40.

All the blades 50—53 have a uniform lead angle $h$, which is typically about 30° to 36° and have a maximum angular displacement peripherally of the rotor body at the respective inner ends of adjacent blades 50, 52 and 51, 53 (and also at corresponding blade portions considered from the inner ends outward) of 90°. Preferably, the angular displacement is at least 20°. Each of the blades 50—53 shown are of uniform cross section throughout their length and, as best shown in FIG. 3, each has a convex leading surface 50a—53a and a concave trailing surface 50b—53b.

Figure 5:
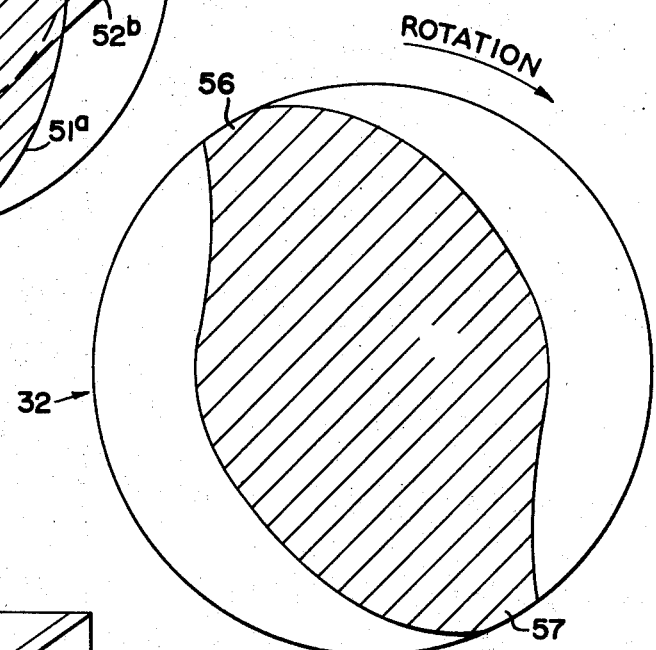
FIG. 5 is a sectional view of the two-bladed rotor of FIG. 2 taken along the line 5–5.

The rotor 32 has two blades 56, 57 extending in opposite directions from the rotor body (i.e., 180° apart in a transverse plane, as shown in FIG. 5). Each blade 56, 57 extends the length of the mixing portion M and has two oppositely twisting surface portions that extend generally helically in opposite directions and merge at a central location of the mixing portion. As shown in FIG. 2, the blades 56, 57 are oppositely oriented from the blades 50—53 of the rotor 30 so that during counterrotation of the rotors. All blades or blade portions twist from the opposite ends of the mixing portions toward the centers away from the direction of rotation of the respective rotor.

The helical blades 44a, 44b and 46a, 46b forming the double screw of the feed section directly join the adjacent ends of the blades 50, 51 and 56, 57 respectively, of the mixing sections of the rotors. Thus, the double feed screw of each rotor provides separate channels to the mixing zones on opposite sides of the blades 50, 51 and 56, 57 of each rotor. The separate channels uniformly divide the material being fed to the mixing section 20b so that the diametrically opposite blades of each rotor are subjected to equal loads. This assures substantial uniformity of mixing action and wear and reduces pulsations in power consumption which may be due to unequal loads on opposite rotor blades. With a single lead screw, the end of one rotor blade stands as an obstacle to the input of material to the mixing section and the input flow may favor one side of the obstructing blade, resulting in unequal load on the rotor blades.

Figure 4:
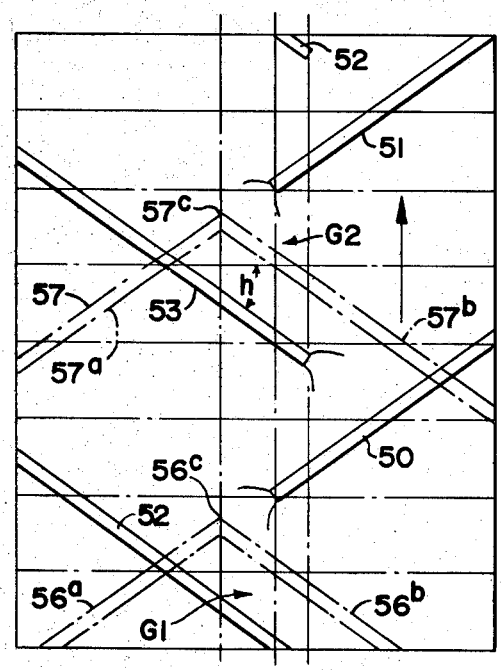
FIG. 4 is a diagrammatic developed view of the four-bladed rotor of FIG. 2.

The cross-sectional shape of the bladed portion of the rotor 32 is shown in FIG. 5. The cross-sectional area is constant along the length of the blade. Preferably, the leading surface is convex and the trailing surface is concave. Edges of the blades 56, 57 are shown in phantom on the diagrammatic developed view of FIG. 4, illustrating the relationship of the blades of the two rotors. In the embodiment shown, each blade 56, 57 has a shorter portion 56a, 57a twisting in one direction, a longer portion 56b, 57b twisting in the opposite direction and an apex 56c, 57c where the blade portions meet. Because of the difference in length of the blade portions, the apices are located on one side of the center of the mixing portion M, which side in the embodiment shown is opposite to that at which the inner ends of the blades 52, 53 are located. The two blade portions of each blade may each extend at the same or a slightly different lead angle about the rotor body. Preferably, the lead angle of each blade portion is approximately 30 to 36°. As an alternative construction, the rotor 32 can be replaced by a four-bladed rotor similar to rotor 30, but with blades that twist in the opposite direction.

The mixing portion M of each rotor 30, 32 includes a central axial passageway 60, 61 through which fluid can be introduced via pipes 62, 63 and rotary unions 64, 65 to control the temperature of the rotors.

In operation, material to be mixed is introduced to the chamber 20 through the hopper 26. The counter rotation of the two rotors 30, 32 causes the feed screws 44, 46 to advance the material along the rotors within the chamber 20 toward the mixing blades of each rotor. By virtue of the oppositely twisting mixing blades or oppositely twisting portions of the mixing blades of the two rotors, the counter rotation of the rotors causes the blades to spread the material within the chamber against the inside surface of the chamber and to work the material within the mixing portion of the chamber. The peripherally displaced blades 50—53 of the four-bladed rotor 30 provide, by virtue of the axially overlapping and peripherally spaced relationship, a limited flow of material through the gaps G1, G2 formed between the inner ends of the adjacent blades so that the material will in part flow in a tortuous mixing path as it is worked by the blades. This provides an intermixing action of the material on opposite sides of the blades and the variation in the mixing action caused by the different construction of the two rotors 30, 32 contributes to the complete and rapid mixing of the material.

During a typical operation, material to be mixed is continuously introduced to the feed screws 44, 46 and mixed material is continuously discharged through the outlet 28. The resistance to the discharge flow at the outlet can be controlled by suitable means, such as a door mechanism that varies the effective size of the discharge opening, to create a desired back pressure within the chamber 20 to maintain the material being mixed under a predetermined pressure.

From the foregoing description of the preferred embodiment of the invention, it will be apparent that the object heretofore enumerated and others have been accomplished and that there has been provided a novel, and improved rotor and continuous mixer useful for processing rubber, plastic and the like.

Although the invention has been described in a detailed manner and with reference to a specific embodiment, it should be understood that the invention is not limited thereto but rather includes all adaptations and modifications within the scope of the appended claims.

I claim:

1. A rotor for use in a continuous internal mixer of the type used for mixing rubber, plastic and the like, having a material feeding portion and a mixing portion axially adjacent thereto, said mixing portion having first and second pairs of blades formed in a generally continuous rotor surface and extending inward from opposite ends thereof, the blades of each pair being displaced one from the other approximately 180° circumferentially about the rotor, each pair extending in a generally opposite helical path toward the center of the rotor, the blades of the first pair being displaced peripherally about the rotor from the second pair.

2. A rotor for use in a continuous internal mixer of the type used for mixing rubber, plastic and the like, having a material feeding portion and a mixing portion axially adjacent thereto, said mixing portion having first and second pairs of blades formed in a generally continuous rotor surface and extending inward from opposite ends thereof, the blades of each pair being displaced one from the other approximately 180° circumferentially about the rotor, each pair extending in a generally opposite helical path toward the center of the rotor, the blades of the first pair being displaced peripherally about the rotor from the second pair, with the inner ends of the blades of the first pair being overlapped axially with respect to the inner ends of the blades of the second pair.

3. A rotor for use in a continuous internal mixer of the type used for mixing rubber, plastic and the like, having a material feeding portion and a mixing portion axially adjacent thereto, said mixing portion having first and second pairs of blades formed in a generally continuous rotor surface and extending inward from opposite ends thereof, the blades of each pair being displaced one from the other approximately 180° circumferentially about the rotor, each pair extending in a generally opposite helical path toward the center of the rotor, the blades of the first pair being displaced peripherally about the rotor from the second pair, the blades of one pair adjacent the material feeding portion being shorter than the blades of the other pair, the inner ends of the longer blades being located axially to one side of the center of the mixing portion, and the blades of both pairs having constant cross-sectional area between opposite ends.

4. A rotor for use in a continuous internal mixer of the type used for mixing rubber, plastic and the like, having a material feeding portion and a mixing portion axially adjacent thereto, both with a basic central cylindrical body portion and extending blades, said mixing portion having first and second pairs of blades formed in a generally continuous rotor surface and extending axially inward from opposite ends of the mixing portion, the blades of each pair being displaced one from the other approximately 180° circumferentially about the rotor, each pair extending in a generally opposite helical path toward the center of the rotor, the blades of the first pair being displaced peripherally about the rotor from the blades of the second pair, and gaps separating the inner ends of adjacent blades, said gaps being of sufficient depth to extend radially inward to a location that approximately corresponds to the circumference of the basic central body portion of the rotor.

5. In a continuous mixer of the type used to mix rubber, plastic and the like, a chamber, a pair of parallel adjacent rotors in said chamber, each rotor having a material feeding portion and an axially adjacent mixing portion, the feeding and mixing portions of each rotor being adjacent the corresponding portion of the other, a first of said rotors having two blades each with blade portions twisting in opposite directions, and a second of said rotors having four blades arranged in pairs, one pair adjacent each opposite end of the mixing portion, the blades of each pair twisting in opposite directions from those of the other and terminating centrally of the mixing portion in peripherally spaced relationship.

6. In a continuous mixer of the type used to mix rubber, plastic and the like, a chamber, a pair of side-by-side rotors in said chamber, each rotor having a material feeding portion and an axially adjacent mixing portion, the feeding and mixing portions of each rotor being adjacent the corresponding portion of the other, a first of said rotors having two blades each with blade portions twisting in opposite directions, and a second of said rotors having four blades arranged in pairs, one pair adjacent each opposite end of the mixing portion, the blades of each pair twisting in opposite directions from those of the other and terminating centrally of the mixing portion in peripherally spaced and axially overlapped relationship.

7. In a continuous mixer of the type used to mix rubber, plastic and the like, a chamber, a pair of side-by-side rotors in said chamber, each rotor having a material feeding portion and an axially adjacent mixing portion, the feeding and mixing portions of each rotor being adjacent the corresponding portion of the other, a first of said rotors having to two blades each with two oppositely twisting portions that meet at a location axially to one side of the center of the mixing portion, and a second of said rotors having four blades arranged in pairs, one pair adjacent each opposite end and twisting in opposite directions from those of the other, terminating centrally of the mixing portion in peripherally spaced and axially overlapped relationship, and the blades of one pair being longer than the blades of the other pair, the inner ends of the blades of both pairs being located axially to one side of the center of the mixing portion opposite from the side at which the blade portions of the blades of the first rotor meet.

8. In a continuous mixer of the type used to mix rubber, plastic and the like, a chamber with an inlet adjacent one end and an outlet adjacent an opposite end, first and second substantially parallel rotors in said chamber each with a screw feed portion adjacent the inlet end of the chamber and a bladed mixing portion adjacent the outlet end of the chamber, the mixing portion of said first rotor having two oppositely projecting blades each with portions that curve or twist generally helically in opposite directions along the axial extent of the mixing portion, and which meet at an apex offset axially from the center of the mixing portion, and the mixing portion of said second rotor having two pairs of oppositely projecting blades, one pair extending from from each end of the mixing portion in generally helical paths axially toward the center and terminating in axially overlapped and peripherally spaced relationship, the blades of one pair curving or twisting in an opposite direction from the blades of the other pair, with corresponding blade portions considered in an axially outward direction from the respective inner ends thereof being displaced angularly, i.e., peripherally one from the other about the rotor, and one pair of blades being longer than the other, with the adjacent ends of the pairs being offset axially from the center of the mixing portion on an opposite side of the center from the apices of the blades on said first rotor and said blades of said second rotor all having approximately the same helix angle and each blade having a substantially constant cross-sectional area along its length.

9. In a continuous mixer of the type used to mix rubber, plastic and the like, a chamber with an inlet and an outlet adjacent opposite ends thereof, a pair of side-by-side rotors in said chamber, each rotor having side-by-side mixing portions within said chamber, the mixing portion of one of said rotors having four blades arranged in pairs at opposite ends of the mixing portion, each of the four blades being spaced peripherally from the next adjacent blade at a central part of the mixing portion and the mixing portion of the other rotor having two blades that extend continuously the length of the mixing portion.

10. In a continuous mixer of the type used to mix rubber, plastic and the like, a chamber with a material inlet and a material outlet adjacent opposite ends thereof, and two rotors in said chamber, each rotor extending axially between said opposite ends of the chamber and each having a mixing portion adjacent that of the other, at least one of said mixing portions having first and second pairs of blades extending inward from opposite ends thereof, the blades of each of said pairs being displaced one blade from the other circumferentially about the rotor and each of said pairs extending in generally oppositely twisting paths toward the center of the rotor and displaced peripherally about the rotor from the other pair.